United States Patent
Chen et al.

(10) Patent No.: US 11,101,082 B2
(45) Date of Patent: Aug. 24, 2021

(54) ON-CHIP SUPERCAPACITOR WITH SILICON NANOSTRUCTURE

(71) Applicant: University of South-Eastern Norway, Kongsberg (NO)

(72) Inventors: Xuyuan Chen, Blommenholm (NO); Pai Lu, Shenyang (CN); Per Alfred Øhlckers, Nesbru (NO)

(73) Assignee: University of South-Eastern Norway, Kongsberg (NO)

( * ) Notice: Subject to any disclaimer, the term of this patent is extended or adjusted under 35 U.S.C. 154(b) by 126 days.

(21) Appl. No.: 16/491,298

(22) PCT Filed: Mar. 6, 2018

(86) PCT No.: PCT/EP2018/055471
§ 371 (c)(1),
(2) Date: Sep. 5, 2019

(87) PCT Pub. No.: WO2018/162479
PCT Pub. Date: Sep. 13, 2018

(65) Prior Publication Data
US 2020/0035420 A1    Jan. 30, 2020

(30) Foreign Application Priority Data
Mar. 7, 2017  (NO) .................................. 20170334

(51) Int. Cl.
*H01G 11/70*   (2013.01)
*H01G 11/46*   (2013.01)
(Continued)

(52) U.S. Cl.
CPC ............. *H01G 11/70* (2013.01); *H01G 11/26* (2013.01); *H01G 11/46* (2013.01); *H01G 11/68* (2013.01); *H01G 11/86* (2013.01)

(58) Field of Classification Search
CPC ..................................................... H01G 11/26
See application file for complete search history.

(56) References Cited

U.S. PATENT DOCUMENTS 8,503,161 B1    8/2013  Chang et al.
9,640,332 B2 *  5/2017  Gardner ................. H01G 11/38
(Continued)

FOREIGN PATENT DOCUMENTS

CN       102737859 A    10/2012
EP          1511058 A1    3/2005
(Continued)

OTHER PUBLICATIONS

Frias Rebelo, Artur, International Search Report for PCT/EP2018/055471; dated Jun. 14, 2018; 4 pages.
(Continued)

*Primary Examiner* — Eric W Thomas
(74) *Attorney, Agent, or Firm* — Shackelford, Bowen, McKinley & Norton, LLP

(57) ABSTRACT

An on-chip supercapacitor has an electrode that includes one-dimensional silicon nano structures coated with a first layer of titanium nitride. The on-chip supercapacitor also includes a second layer of manganese dioxide deposited on the first layer. An associated method of providing an on-chip supercapacitor electrode on a silicon substrate includes providing a plurality of one-dimensional silicon nanostructures on a substrate, coating the one-dimensional silicon nanostructures with a first layer of titanium nitride, and coating a second layer of manganese dioxide onto the first layer.

11 Claims, 4 Drawing Sheets

(51) Int. Cl.
*H01G 11/86* (2013.01)
*H01G 11/26* (2013.01)
*H01G 11/68* (2013.01)

(56) References Cited

U.S. PATENT DOCUMENTS

| | | |
|---|---|---|
| 2008/0247118 A1 | 10/2008 | Long et al. |
| 2011/0102968 A1 | 5/2011 | Choi et al. |
| 2011/0304964 A1 | 12/2011 | Fleischer et al. |
| 2012/0236467 A1 | 9/2012 | Kang et al. |
| 2013/0071751 A1 | 3/2013 | Tajima et al. |
| 2014/0205902 A1 | 7/2014 | Zhao et al. |
| 2014/0233152 A1 | 8/2014 | Gardner et al. |
| 2014/0301020 A1 | 10/2014 | Dunn et al. |
| 2015/0092318 A1 | 4/2015 | Zhaohui |
| 2016/0107178 A1 | 4/2016 | Velasquez-Garcia et al. |
| 2016/0148759 A1 | 5/2016 | El-Kady et al. |
| 2016/0172123 A1 | 6/2016 | Yang et al. |
| 2016/0314906 A1 | 10/2016 | Stucky et al. |

FOREIGN PATENT DOCUMENTS

| | | | |
|---|---|---|---|
| EP | 2764529 B1 | | 2/2016 |
| EP | 3067313 A1 | | 9/2016 |
| JP | 10321481 A | * | 12/1998 |
| WO | WO-2010/144153 A2 | | 12/2010 |
| WO | WO-2011/143777 A1 | | 11/2011 |
| WO | WO-2013037951 A1 | | 3/2013 |
| WO | WO-2016059296 A1 | | 4/2016 |
| WO | WO-2018162580 A2 | | 9/2018 |

OTHER PUBLICATIONS

Ghosh, R., et al.; "Silicon nanowire heterostructures for advanced energy and environmental applications: a review"; Nanotechnology, vol. 28, No. 1; Nov. 28, 2016; 26 pages.

Fiorentino, Giuseppe, et al.; "Impact of the atomic layer deposition precursors diffusion on solid-state carbon nanotube based supercapacitors performances"; Nanotechnology 26 (2015); Jan. 20, 2015; 11 pages.

Wikimedia Foundation, Inc.; "Electrolytic capacitor"; https://en.wikipedia.org/wiki/Electrolytic_capacitor; accessed on Dec. 30, 2016; 28 pages.

Grigoras, Kestutis, et al.; "Conformal titanium nitride in a porous silicon matrix: A nanomaterial for in-chip supercapacitors"; Nano Energy, vol. 26; http://www.sciencedirect.com/science/article/pii/S2211285516300842_Nano_Energy; Aug. 2016; pp. 340-345.

Sun, Wei; "Three dimensional MEMS supercapacitors"; A Thesis Submitted to the Department of Physics at University of Oslo; Oct. 2010; 122 pages.

Jiang, Y.Q., et al.; "Planar MEMS Supercapacitor using Carbon Nanotube Forests"; IEEE 22nd International Conference on Micro Electro Mechanical Systems, Sorrento, Italy; Jan. 25-29, 2009; pp. 587-590.

"Satte verdensrekord på HiVe"; http://byavisa.sandefjord.no/nor/Naering/Aktuelt/Satte-verdensrekord-p . . . ; Mar. 9, 2011; 2 pages.

Conway, Brian Evans; *Electrochemical Supercapacitors: Scientific Fundamentals and Technological Applications*; Springer; 1999; pp. 1-9.

Lang, Xingyou, et al.; "Nanoporous metal/oxide hybrid electrodes for electrochemical supercapacitors"; Nature Nanotechnology, vol. 6; Feb. 20, 2011; pp. 232-236.

Bae, Joonho, et al.; "Fiber Supercapacitors Made of Nanowire-Fiber Hybrid Structures for Wearable/Flexible Energy Storage"; Angew. Chem. Int. Ed., vol. 50; Jan. 14, 2011; pp. 1683-1687.

Zheng, Wen, et al.; "High-performance solid-state on-chip supercapacitors based on Si nanowires coated with ruthenium oxide via atomic layer deposition"; Journal of Power Sources 341 (2017); Dec. 2, 2016; pp. 1-10.

Lu, Pai; et al.; "Nano fabricated silicon nanorod array with titanium nitride coating for on-chip supercapacitors"; Electrochemistry Communications 70 (2016); Jul. 4, 2016; pp. 51-55.

Müller, L., et al.; "Infrared emitting nanostructures for highly efficient microhotplates"; Journal of Micromechanics and Microengineering 24 (2014); Feb. 28, 2014; 9 pages.

De Volder, M., et al.; "Controlled Growth Orientation of Carbon Nanotube Pillars By Catalyst Patterning in Microtrenches"; Transducers 2009; 2009 International Solid-State Sensors, Actuators and Microsystems Conference; Jun. 21-25, 2009; pp. 2046-2049.

Li, Lin, et al.; "Floral-clustering few-layer graphene nanosheet array as high performance field emitter"; Nanoscale, vol. 4; Sep. 5, 2012; pp. 6383-6388.

Quan, Baogang, et al.; "Vertical few-layer graphene/metalized Si-nanocone arrays as 3D electrodes for solid-state supercapacitors with large areal capacitance and superior rate capability"; Applied Surface Science, vol. 404; Feb. 1, 2017; pp. 238-245.

Cho, S.J., et al.; "Three-dimensional network of coaxial carbon nanotube/manganese oxides electrode for supercapacitors"; RCS Adv., vol. 7; Jan. 4, 2017; pp. 1282-1285.

* cited by examiner

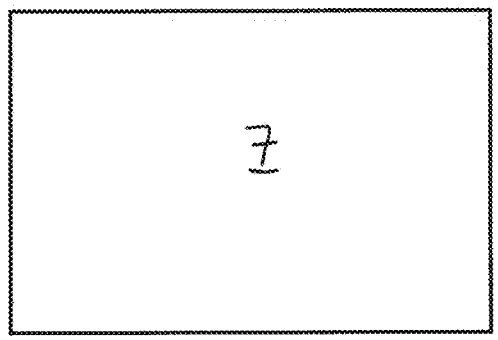
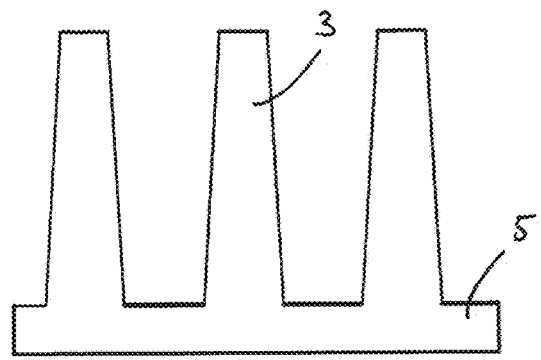
Fig. 3a Fig. 3b
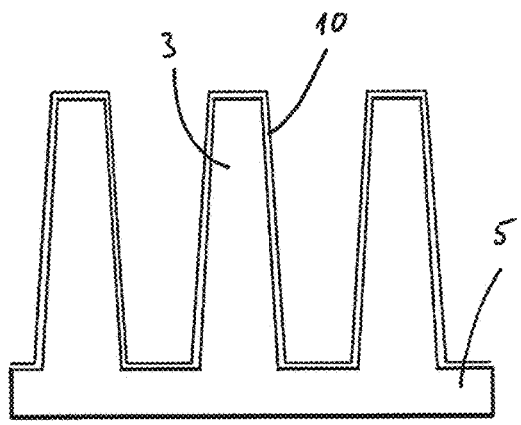
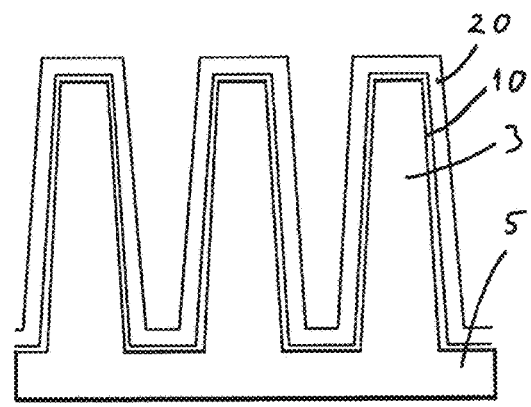
Fig. 3c Fig. 3d

ON-CHIP SUPERCAPACITOR WITH SILICON NANOSTRUCTURE

TECHNICAL FIELD

The present invention relates to so-called supercapacitors comprising electrodes with a nanostructure scaffold. Such supercapacitors have been shown to exhibit impressive properties that may be exploited in various applications. In particular, the present invention relates to an on-chip supercapacitor that is produced with a method, which is compatible with the fabrication methods for on-chip electric circuitry.

A group of supercapacitors are called pseudocapacitors. Supercapacitors are high-capacity capacitors with capacitance values much higher than other capacitors. Pseudocapacitors are supercapacitors consisting of both electrical double layer (EDCL) capacitance effect and pseudocapacitance effect, the latter using an electrochemical active material giving an electron charge-transfer between electrolyte and electrode coming from a de-solvated and adsorbed ion. (Reference: Conway, Brian Evans (1999), Electrochemical Supercapacitors: Scientific Fundamentals and Technological Applications (in German), Berlin, Germany: Springer, pp. 1-8, ISBN 0306457369).

BACKGROUND ART

Capacitive units referred to as supercapacitors have been developed, which exploit nanostructure electrodes to obtain high energy densities. However, since overloading (excessive deposition of materials) of the pseudo-capacitive materials that are applied on the electrodes usually causes weak electric conductivity and sluggish ionic conductivity, the obtained capacitance of pseudo-capacitive electrodes is still far below the theoretical values. Thus, an object of the present invention may be to provide a supercapacitor with a nanostructure electrode, which offers improved capacitance and energy density. Another object of the present invention may be to provide a method of producing such a supercapacitor.

In particular, an object of the present invention may be to provide a conformal coating on the nanostructures, for improved capacitor characteristics.

Supercapacitors are often referred to as electrochemical capacitors and include both electrical double layer capacitors (EDLC) and pseudocapacitor, the latter also having an electrochemical active material. Supercapacitors are different from conventional dielectric and electrolytic capacitors.

The article «*Fiber Supercapacitors Made of Nanowire-Fiber Hybrid Structures for Wearable/Flexible Energy Storage*», J. Bae, Angewandte Chemie. Int. Ed. 50 (2011) 1683-1687, discloses a solution where an array of ZnO nanowires was coated with $MnO_2$ for use in a supercapacitor.

Silicon as such is not electrochemically stable in commercially available electrolytes. Thus, to employ silicon nanostructures for supercapacitor application, the silicon must be protected by a passivation layer. To fabricate an effective passivation layer on one-dimensional silicon nanostructures has been shown to be difficult. Consequently, there are few references in the prior art describing the use of silicon one-dimensional nanostructures in supercapacitors.

The article "*Nano fabricated silicon nanorod array with titanium nitride coating for on-chip supercapacitors*", Lu, Electrochemistry Communications 70 (2016), 51-55, discuss silicon nanorod arrays coated with TiN for use in a supercapacitor.

Publication US20140301020 discuss a mesoporous nanocrystalline film architecture for capacitive storage devices.

SUMMARY OF INVENTION

The present invention is based on providing a layer of manganese dioxide on an elongated/one-dimensional silicon nanostructure that has a layer of titanium nitride (TiN). As used with a supercapacitor according to the invention, the layer of titanium nitride functions as a current collector, while the manganese dioxide layer functions as an electrochemical active material, creating a pseudocapacitor structure.

In supercapacitors according to the present invention, the TiN layer, which is coated on the Si nanostructure, fulfills two technical objects. One is as a protective passivation layer to avoid the corrosion of electrolyte, and the other is as a current collector.

According to the invention, there is provided a ternary composite electrode structure based on silicon elongated/one-dimensional nanostructures coated with the titanium nitride nano-layer current collector and manganese dioxide ($MnO_2$) capacitive functional nano-layer. The silicon nanostructure electrode scaffold endow an improved surface gain for energy storage, which is better than that of a flat silicon substrate. The nano-layer of titanium nitride current collector ensures low series resistance and both chemical and mechanical stability of silicon. The conformal and uniform coating of manganese dioxide results in high utilization of active material and a large surface area of active redox centres.

The possible packing or density of the one-dimensional silicon nanostructures (their mutual distance) will depend on the thickness of the first and second layers. On one hand, it is desirable to obtain a high density of the silicon nanostructures, while on the other hand, the density should preferably not be so high that the deposited layers will abut against layers of neighboring nanostructures.

Of the same reason, it is preferred that the nanorods are arranged in a structured manner, so that they, with their layers, do not abut against each other. However, an arbitrary arrangement of elongated/one-dimensional nanostructures, be it nanowires or nanorods or other elongated structures, will also be usable for producing a supercapacitor according to the present invention.

To prevent mutual contact between neighboring elongated nanostructures, it is further preferred that the two layers are conformal. In that way, one prevents that some excessively thick portions of layers result in contact with neighboring structures.

According to a first aspect of the present invention, there is provided an on-chip supercapacitor having an electrode comprising one-dimensional silicon (Si) nanostructures that are coated with a first layer of titanium nitride (TiN). According to the invention, it further comprises a second layer of manganese dioxide (MnO2) deposited on the first layer.

With the term "on-chip", as in "on-chip supercapacitors", it is herein meant capacitors that are produced on silicon chips, produced from silicon wafers, either as independent units or as capacitors in Si-based integrated circuits. In the latter case, the capacitors can typically constitute a functional part of the integrated circuit.

With the term one-dimensional silicon nanostructure, is herein meant a nanostructure of silicon having an elongated, thin shape, such as a hair (by means of shape, not by means of dimension), with an aspect ratio above 5. Such silicon structures are often referred to in the art as silicon nanorods or nanowires.

In some embodiments, the one-dimensional silicon nanostructures can extend upright from a silicon base in a pre-determined pattern. That is, the nanostructures, often referred to as nanorods when arranged according to this embodiment, can be produced in predetermined positions on the silicon substrate. This may be done by a top-down or bottom-up method. Typically, the pattern will exhibit a systematic layout of the nanostructures, such as parallel rows. Such rows are often referred to as nanorod arrays. Moreover, the predetermined pattern is such that the nanorods are arranged with a mutual distance between them, so that they are substantially not in contact with each other. Such a distance is appropriate for increasing the capacitance of the supercapacitor. Such a mutual distance should advantageously allow for coating of the current collector layer (TiN), and active material layer ($MnO_2$), and thus provide a large capacitance of the supercapacitor.

In preferred embodiments, the second layer can be a substantially conformal layer.

As used herein, the term "conformal layer" shall mean that the outer surface of the conformal layer is substantially parallel with the inner surface of the same layer. Moreover, conformal layer means in the context of the present invention that the coated layer can maintain the morphology of the original template, and the thickness of the coated layer is substantially or nearly identical around the silicon nanostructure.

Advantageously, according to some embodiments, the second layer has been coated onto the first layer with an electro-less chemical deposition process. Such embodiments will be discussed in detail with reference to example embodiments further below.

In particular embodiments, the said electroless chemical deposition process may include exposing the nanostructures with the first layer to a solution of $KMnO_4$ that is exposed to an atmosphere containing $N_2H_4$ vapor. Advantageously, the solution may be an aqueous solution.

The concentration of $N_2H_4$ vapor can in some embodiments be within the range of 1-10 vol %. In such embodiments and in other embodiments, the gas pressure can be within the range of 1-3 atmospheres.

Typically, in some embodiments, the $N_2H_4$ vapor can be mixed with an inert gas, such as argon (Ar).

According to a second aspect of the present invention, there is provided a method of providing an on-chip supercapacitor electrode on a silicon substrate. The method comprises the following steps:
  a) providing a plurality of one-dimensional silicon nanostructures on a substrate;
  b) coating the one-dimensional silicon nanostructures with a first layer of titanium nitride (TiN);
  c) coating a second layer of manganese dioxide ($MnO_2$) onto the first layer.

In some embodiments of the method according to the second aspect of the invention, step c) may comprise an electroless chemical deposition process.

Advantageously, the second layer is a conformal layer.

In some embodiments, step c) of the method can include the following step:

i) in a reaction chamber, exposing the one-dimensional silicon nanostructures (3) to a solution containing $KMnO_4$, wherein the solution is exposed to $N_2H_4$ gas.

The $KMnO_4$-containing solution can advantageously be an aqueous solution.

Step i) may advantageously include performing step c) for a reaction period of between 6 and 12 hours.

Supercapacitors are different from the conventional dielectric capacitors from the viewpoint of energy storage mechanism, which stores energy by formation of electric double layer (thickness in nanometer scale) between electrode and electrolyte interface (electric double layer supercapacitor), or by reversible faradic reaction between active electrode material and electrolyte at their interface (pseudocapacitor). In the supercapacitor provided according to the present invention, the $Si/TiN/MnO_2$ electrode is used to configure a pseudo-capacitor.

BRIEF DESCRIPTION OF DRAWINGS

While a general discussion of the present invention has been given above, some more detailed examples of embodiment are given in the following with reference to the drawings, in which

FIG. 3a to FIG. 3d principally illustrate the production of coated silicon nanostructures used in a supercapacitor according to the present invention;

DETAILED DESCRIPTION OF THE INVENTION

Figure 1:
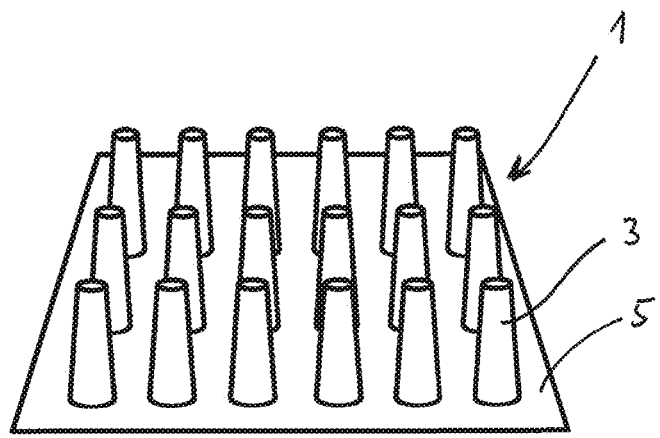
FIG. 1 depicts a principle perspective view of silicon nanorod arrays produced in a silicon wafer.

FIG. 1 illustrates silicon nanorod arrays 1 comprising silicon nanorods 3 extending upwards from a silicon base 5. The nanorods 3 can typically be produced with deep reactive ion etching (DRIE) in a silicon wafer. Typical heights of the nanorods 3 can be between 3 and 6 μm. In some embodiments, typical height is 5 μm. Typical widths or diameters of the nanorod trunks can be between 0.2 to 1.5 μm, more typically about 0.5 μm.

Figure 2:
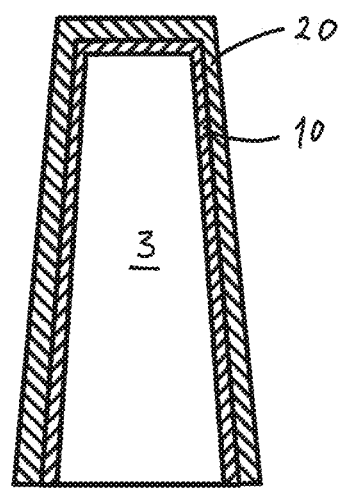
FIG. 2 is an enlarged cross section view of one nanorod, having a first and a second layer deposited onto it.

FIG. 2 depicts a cross section through one of the nanorods 3. The silicon nanorod 3 has been coated with a first layer 10 and a second layer 20. According to the invention, the first layer 10 is a titanium nitride (TiN) layer. Also according to the present invention, the second layer 20 is a manganese dioxide ($MnO_2$) layer.

As the skilled person will appreciate, the illustrations of FIG. 1 and FIG. 2 are principle drawings only, in which layer thickness, aspect ratios, shape etc. not necessarily are correct.

The first layer 10 of TiN can advantageously be between 10 and 50 nm thick, preferably between 20 and 40 nm, and more preferably about 30 nm thick. The second layer 20 of $MnO_2$ can advantageously be between 50 and 150 nm thick, preferably between 70 and 120 nm, and more preferably between 80 and 100 nm thick.

While some dimensions of the nanorods and the first and second layers are suggested herein, embodiments having other dimensions may also fall within the scope of the present invention.

FIG. 3a to FIG. 3d principally depicts the steps of producing a silicon nanorod array coated with the first and second layer, according to an embodiment of the present invention. All four figures are cross section side views through an upper part of a silicon wafer 7.

FIG. 3a principally depicts a part of a silicon wafer 7, which has not yet been processed. With a DRIE process (deep reactive ion etching), silicon material is removed from the wafer, leaving a plurality of silicon nanorods 3 extending in an upright orientation, from the silicon base 5, as shown in FIG. 3b. As the skilled person will appreciate, the shape of the nanorods 3 in a more realistic embodiment may have a larger aspect ratio (length/diameter) than what is shown in FIG. 3b. Also, their shape may be less coned, i.e. more symmetrical.

FIG. 3c depicts the nanorods 3 after having been coated with the first layer 10, comprising TiN. Finally, FIG. 3d depicts the nanorods 3 having been coated also with the second layer, comprising $MnO_2$.

Fabrication of TiN Coated Silicon Nanorod Array Scaffold

To produce the nanorods in a silicon wafer, a cyclic DRIE (deep reactive ion etching) process can be used. Such a process is known to the person skilled in the art, and will not be discussed in detail herein. While the DRIE process is a so-called top-down process, where silicon material is removed to obtain remaining nanorods, one may also employ a bottom-up process to produce the elongated nanostructures.

After producing the silicon nanorods, they are coated with a layer of TiN. This can advantageously be performed with an atomic layer deposition (ALD) process. This is also a process known to the skilled person. Details of these processes, for the production of the nanorods used with an embodiment of the present invention can be found in the following two papers:

Lu (P. Lu, P. Ohlckers, L. Mueller, S. Leopold, M. Hoffmann, K. Grigoras, J. Ahopelto, M. Prunnila, X. Y. Chen), "*Nano fabricated silicon nanorod array with titanium nitride coating for on-chip supercapacitors*" Electrochem. Commun. 70 (2016) 51-55; and Mueller (L. Mueller, I. Kapplinger, S. Biermann, W. Brode, M. Hoffmann, J.), «*Infrared emitting nanostructures for highly efficient microhotplates*», Micromech. Microeng. 24 (2014) 035014.

Coating of $MnO_2$ Pseudo-Capacitive Layer by Electrochemical Deposition

In order to obtain a high areal capacitance, one wants to obtain sufficient mass loading of $MnO_2$ anchored to the trunks of the nanorods.

In one embodiment, the $MnO_2$ layer can be produced with an electrochemical deposition (ED) method. Advantageously, a layer of $MnO_2$ can be deposited on the Si—NR/TiN (silicon nanorod titanium nitride) scaffold by a galvanostatic process at a current density of 0.1-0.8, preferably 0.4 $mA/cm^2$ for 10-40, preferably 12-20 minutes, conducted in an aqueous solution of 0.005-0.02, preferably 0.01 M $Mn(CH_3COO)_2$ and 0.01-0.04, preferably 0.02 M $Na_2SO_4$, performed in a three-electrode system (Ag/AgCl (in saturated KCl) reference electrode and Pt foil counter electrode) at room temperature.

While the use of the electrochemical deposition method to coat the nanorods produces supercapacitors having good properties, the anticipated surface gain endowed by the Si—TiN nanorods scaffold has not been fully attained. Results have shown that $MnO_2$ tends to clog at the top portions of the nanorods. It is expected that this is a result of the inhomogeneous electric field distribution during the electrochemical deposition.

Coating of $MnO_2$ Pseudo-Capacitive Layer by Electroless Chemical Deposition

In an alternative embodiment, the $MnO_2$ layer can be produced with an electroless chemical deposition (CD) of $MnO_2$. Such deposition can in some embodiments be performed at room temperature by a modified method disclosed in "*Nanoporous metal/oxide hybrid electrodes for electrochemical supercapacitors*", Chen et al., Nature nanotechnology 6, 2011, 232-236.

Specifically, Si—NR/TiN (silicon nanorods with titanium nitride layer) samples can be floated on or submerged in an aqueous solution (e.g. 200 mL) containing 1 to 4 mM, preferably 2 mM $KMnO_4$ and 2 to 10 mM, preferably 5 mM KOH in a first beaker (e.g. a 200 mL beaker).

Hydrazine, for instance 400 mL 40-50 wt % hydrazine, can be loaded in a second beaker (e.g. a 500 mL beaker). The first and second beakers can be placed in a sealed chamber. During the reaction process, preferably between 6 and 12 hours, the volatile $N_2H_4$ as the reductant is introduced to the $KMnO_4$ solution, thus giving rise to $MnO_2$ grown onto the Si—NR/TiN scaffold.

Instead of performing the above process in room temperature, one may also use temperatures outside room temperatures. For instance, one may use a temperature within the range of 20 to 80° C.

One may advantageously perform the above deposition process at ambient pressure, i.e. at 1 atmosphere. One may in some embodiments perform the process within a pressure range of 1 to 3 atm. A process pressure different from ambient pressure will require a pressure vessel.

The process time may be within the range of 1 to 12 hours. An elevated pressure and/or elevated temperature will reduce the needed process time. This may be advantageous in particular in a chip production line at a fabric.

When floating the wafers on the $KMnO_4$ solution, the face of the wafer where the TiN coated nanorods are provided faces down into the solution. I.e. the scaffold is wetted with the $KMnO_4$ solution. One may also submerge the entire wafer into the solution, but then the opposite side of the wafer would be contaminated by the $KMnO_4$ solution, which normally may not be preferred.

During this deposition process, where $MnO_2$ is grown or deposited onto the Si—TiN scaffold, the $N_2H_4$ vapor diffuses into the liquid $KMnO_4$ solution, and the $MnO_2$ will be formed by the reaction between $KMnO_4$ and $N_2H_4$ on TiN layer.

During this deposition process, the following reaction takes place, resulting in the conformal $MnO_2$ layer on the TiN layer:

$4KMnO_4 + 3N_2H_4 \rightarrow MnO_2 + 3N_2 + 4H_2O + 4KOH$

The electroless chemical deposition results in far better $MnO_2$ layer conformity, as compared to the electrochemical deposition process discussed above. Characterization by use of energy-dispersive X-ray spectroscopy (EDX) has shown that in one embodiment, the atomic percentage of Mn in the nanorod tip is close to that in the nanorod trunk (13.2% vs. 12.4%, respectively). Thus, by using the CD layer deposition process, a conformal layer of $MnO_2$ is provided to the TiN coated silicon nanorod scaffold.

This deposition method, for obtaining a conformal layer of $MnO_2$ on the silicon TiN nanostructure scaffold is suitable for implementation in a silicon integrated circuit production line. The process can then be performed as three-step batch process:

(1) Silicon wafers can be etched by DRIE on a silicon etching production line;
(2) ALD (atomic layer deposition) TiN growth can be performed on an ALD production line;
(3) $MnO_2$ growth can be provided by holding the fabricated Si wafer, with the Si—TiN scaffold down on a $KMnO_4$ solution (in a suitably sized container, the size depending on the production scale), in a $MnO_2$ deposition production line.

The hydrazine atmosphere in step (3) can be provided by steaming the liquid hydrazine. Both sealed or opened reaction container can be used. The critical point is to keep the hydrazine concentration sufficiently constant by continuous feeding of new hydrazine steam.

Figure 7:
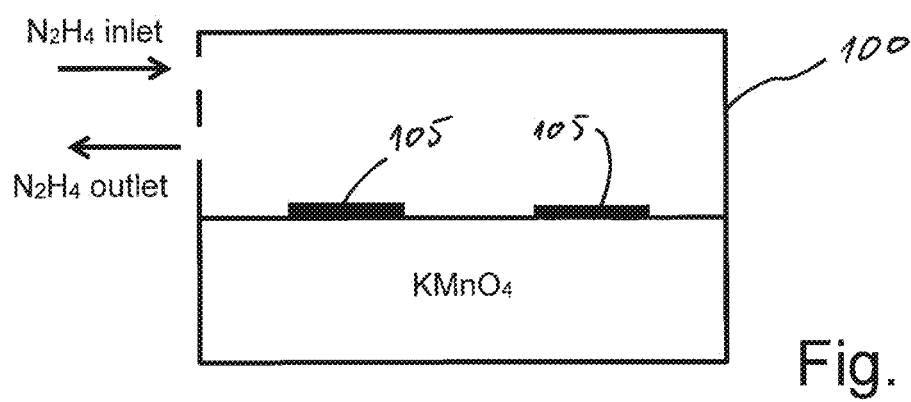
FIG. 7 schematically illustrates a setup for performing the $MnO_2$ deposition step.
Figure 8:
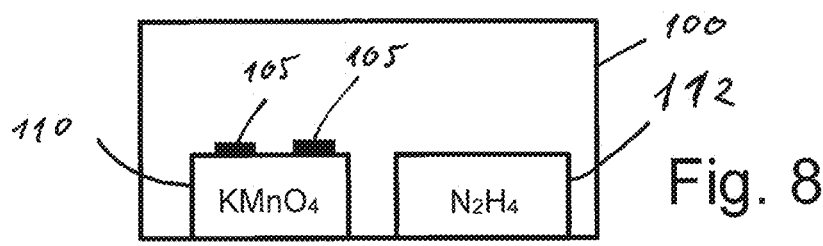
FIG. 8 schematically illustrates an alternative setup for performing the $MnO_2$ deposition step.

FIG. 7 and FIG. 8 schematically illustrate two methods of performing the $MnO_2$ deposition step. In FIG. 7, hydrazine gas is flowed into a reaction chamber 100 through a hydrazine inlet, and back out from the reaction chamber through a hydrazine outlet. Two wafers 105 are shown, on top of a $KMnO_4$ solution, as discussed above. In FIG. 8, a first beaker 112 of hydrazine is instead placed inside a sealed reaction chamber together with a second beaker 110 with the solution of $KMnO_4$, with the wafers 105.

Other methods of applying the $MnO_2$ layer are also feasible. One may for instance use electrochemical plating. However, the electroless chemical deposition method is preferred, as it produces the most conformal layer on the silicon-TiN-nanorod scaffold.

Due to the different results from the different methods of depositing the $MnO_2$ layer (electrochemical deposition and electroless chemical deposition discussed above), different compactness of the silicon nanostructures may be employed. As discussed above, the one-dimensional silicon nanostructures may be laid out in a predetermined pattern, such as nanorod arrays. In such nanorod array embodiments, a compactness of up to the range of $1.0$-$2.0 \times 10^6$ nanorods/$mm^2$ can be suitable for the electroless chemical deposition method. With the electrochemical deposition process, a compactness up to the range of $0.5$-$1.0 \times 10^6$ nanorods/$mm^2$ can be appropriate.

Capacitance with and without $MnO_2$ Layer and with Different $MnO_2$ Layers

Figure 4:
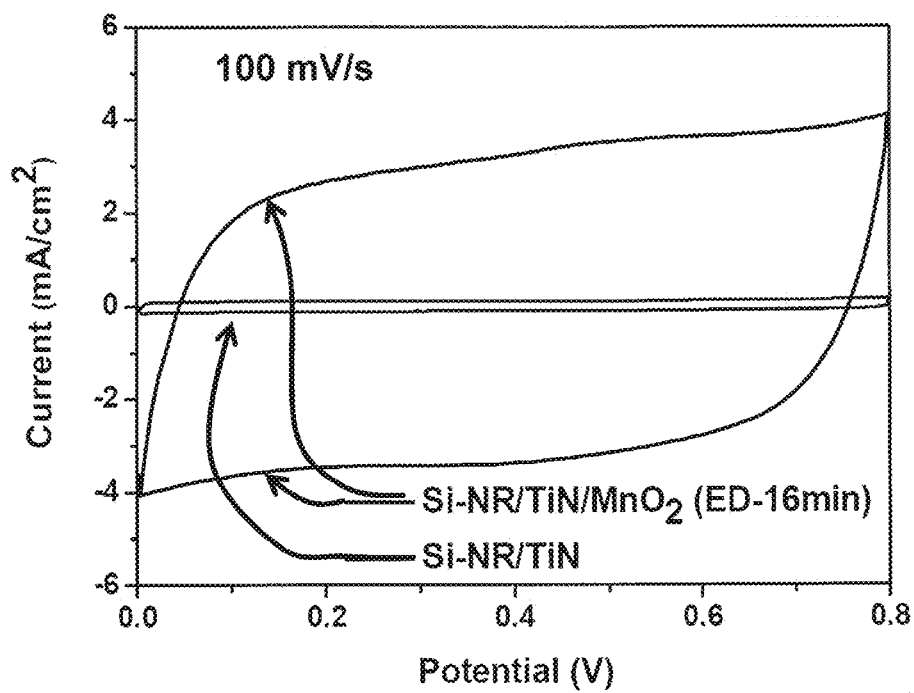
FIG. 4 is a current-voltage diagram for a supercapacitor according to prior art and a supercapacitor according to the invention.

FIG. 4 depicts two current-voltage-curves for two different supercapacitors with silicon nanorods coated with a TiN layer, measured at 100 mV/s. One curve represents an embodiment having only the TiN layer (as known from prior art). The other curve is for an embodiment according to the invention, wherein a $MnO_2$ layer is applied onto the TiN layer. In this diagram, the two substantially flat lines close to the zero current value, represent the current-voltage diagram for the embodiment without the $MnO_2$ layer. The two other lines represent the current-voltage diagram for the embodiment according to the invention, having the $MnO_2$ layer. This capacitor was produced by applying the $MnO_2$ layer by means of 16 minutes of electrochemical deposition. This figure clearly demonstrates how the $MnO_2$ layer significantly contributes to the areal capacitance (compare the significantly larger area enclosed by the Si—TiN—$MnO_2$ scaffold with the Si—TiN scaffold). The calculated capacitance for the embodiment having this Si—TiN—$MnO_2$ scaffold electrode is 28.4 $mF/cm^2$, as evaluated at 100 mV/s scan rate. This is about 30 times higher than that of the Si—TiN electrode.

Figure 5:
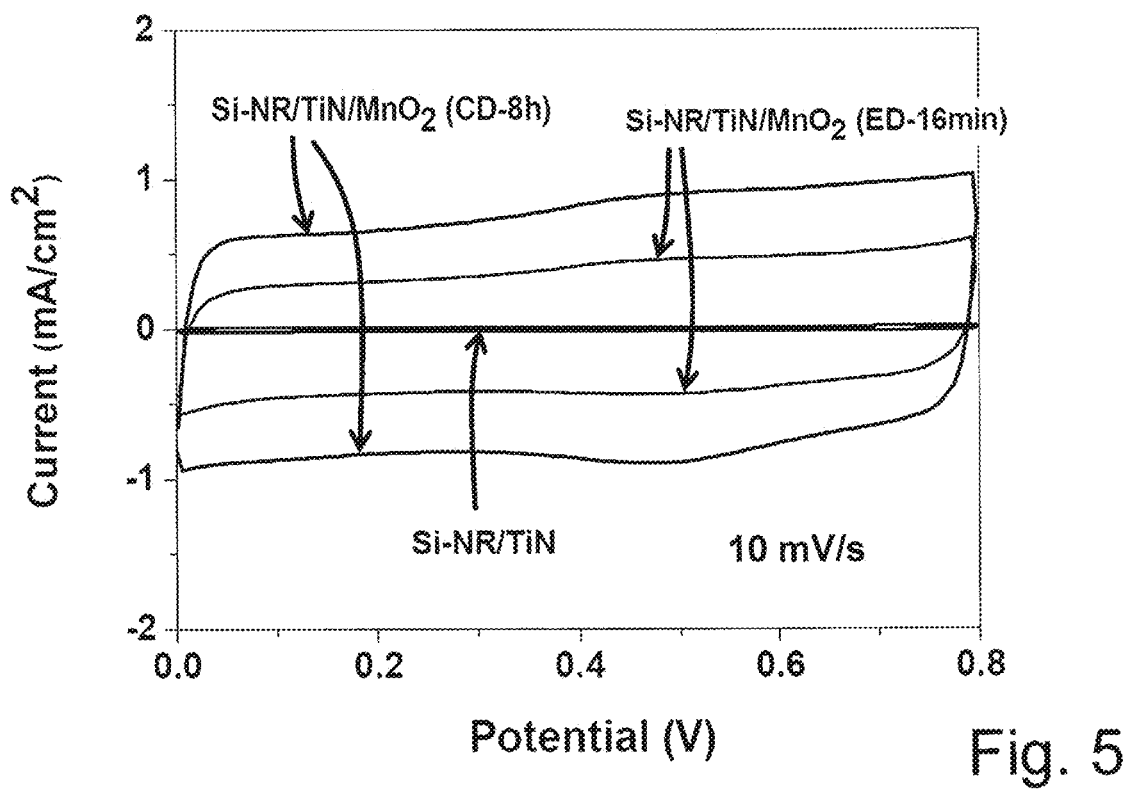
FIG. 5 is a current-voltage diagram for a supercapacitor according to prior art and for two supercapacitors according to the invention.

FIG. 5 also shows current-voltage curves, corresponding to the diagram discussed above. In this diagram, the current-voltage curve of three different capacitors is plotted. Referring to FIG. 5, the curve encapsulating the smallest area (appearing almost as two parallel lines or one line at the zero current level), represents a capacitor having silicon nanorods coated with SiN, but without any further layer (prior art). The two lines ("ED-16 min") closest to this curve represent a capacitor with an electrode made of Si nanorods coated with TiN and a $MnO_2$ layer deposited by means of the electrochemical deposition method for 16 minutes. Finally, the uppermost and lowermost lines ("CD-8 h") represent the current-voltage curve for an embodiment where the $MnO_2$ layer has been coated onto the TiN layer by means of the developed electroless chemical deposition method for 8 hours. As can be seen in this figure, the areal capacitance (78.1 $mF/cm^2$ at 10 mV/s) for the CD-8 h embodiment is about 2 times as large as the areal capacitance for the ED-16 min embodiment (39.3 $mF/cm^2$ at 10 mV/s), and about 70 times larger than that of the prior art embodiment lacking the $MnO_2$ layer (1.15 $mF/cm^2$ at 10 mV/s).

Capacitance Retention

Figure 6:
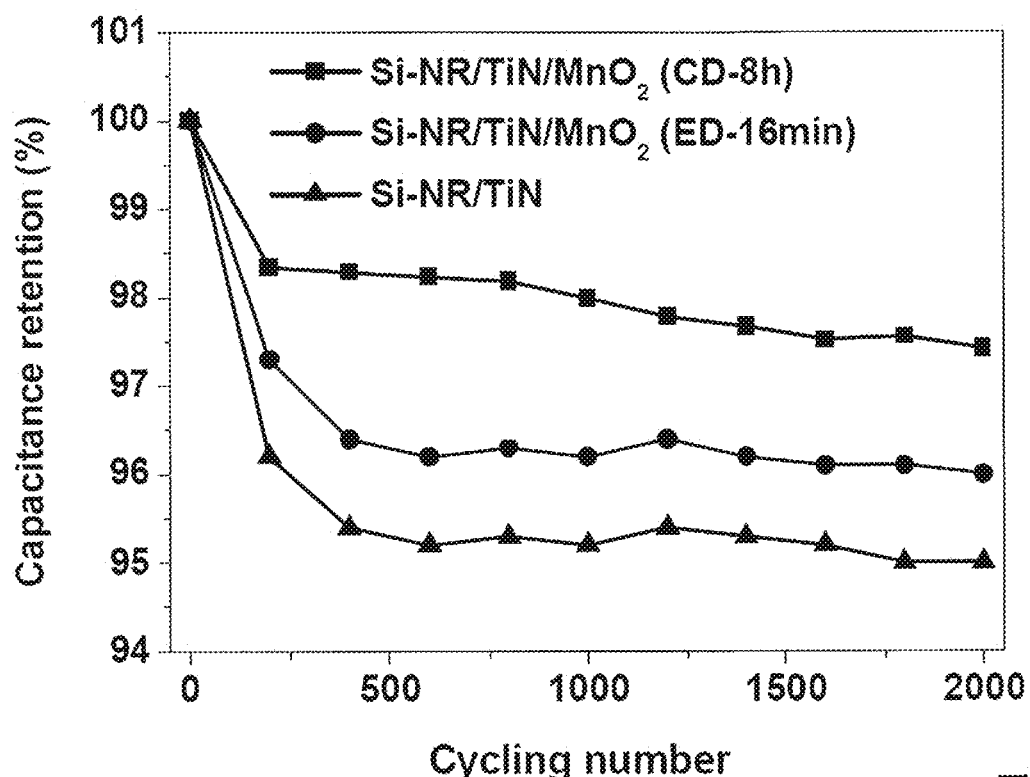
FIG. 6 depicts capacitance retention for three different on-chip supercapacitors, of which one is according to prior art and the other two are according to the present invention.

FIG. 6 depicts capacitance retention for three different on-chip supercapacitors, after 2000 charge and discharge cycles. Of the three curves, the upper is a supercapacitor with silicon nanorods provided with TiN and $MnO_2$, wherein the $MnO_2$ layer is loaded with an 8 hours exposure to electroless chemical deposition ("CD-8 h" curve). The middle curve represents similar nanorods, however having the $MnO_2$ layer deposited onto the TiN layer by means of 16 minutes electrochemical deposition process ("ED-16 min" curve). The lower curve represents the capacitance retention of a supercapacitor having the silicon nanorods with only the TiN layer (i.e. no $MnO_2$ layer), for comparison. It should be noted that although the curves for all three embodiments starts at the 100% level, they do not exhibit the same capacitance. I.e. the diagram merely illustrate the capacitance retention rate.

It is clear that the retention rate of the "CD-8 h" curve is significantly less than the "ED-16 min" curve, even if both represents supercapacitors having the $MnO_2$ layer on the TiN layer. While all three curves drop rapidly during the approximately 200 first cycles, the "CD-8 h" curve flattens out at about 98% of the initial capacitance value. The "ED-16 min" curve flattens out at about 96-97%.

With regard to the lower curve, representing the TiN layered silicon nanorod arrays without any further layer, the main reason for capacitance fading is the gradual oxidation of TiN in aqueous electrolyte. This problem can be alleviated by conformal coating of $MnO_2$ on the TiN layer, as a protecting layer. Since the embodiment represented by the "CD-8 h" curve (8 hours chemical deposition of $MnO_2$) provides a more conformal and uniform $MnO_2$ layer than the embodiment represented by the "ED-16 min" curve (16 minutes electrochemical deposition of $MnO_2$), better capacitance stability is provided.

Thus, the $MnO_2$ layer deposited by means of the developed electroless chemical deposition, as discussed above, both increases capacitance and increases capacitance retention. Also, due to the conformal deposition of this layer, one may use a silicon-TiN scaffold with relatively densely packed nanorods, without the $MnO_2$ layer resulting in contact between adjacent nanorods.

The silicon nanorod TiN scaffold exhibits large mechanical stability. Thus, it assists the outer layer of $MnO_2$ to tolerate the volume variation that occurs during the redox reaction with solvated sodium ions. This synergetic effect results in an improved cycling performance of the electrode according to the invention.

The invention claimed is:

1. An on-chip supercapacitor comprising:
    an electrode comprising one-dimensional silicon (Si) nanostructures coated with a first layer of titanium nitride (TiN); and
    a second layer of manganese dioxide ($MnO_2$) deposited on the first layer.

2. The on-chip supercapacitor according to claim 1, wherein the one-dimensional silicon nanostructures extend upright from a silicon base in a pre-determined pattern.

3. The on-chip supercapacitor according to claim 1, wherein the second layer is a substantially conformal layer.

4. The on-chip supercapacitor according to claim 1, wherein the second layer has been coated onto the first layer with an electroless chemical deposition process.

5. The on-chip supercapacitor according to claim 4, wherein the electroless chemical deposition process includes exposing the one-dimensional silicon (Si) nanostructures with the first layer to a solution of $KMnO_4$ that is exposed to an atmosphere containing $N_2H_4$ vapor.

6. The on-chip supercapacitor according to claim 5, wherein a concentration of $N_2H_4$ vapor is within a range of 1-10 vol % and that a gas pressure is within a range of 1-3 atmospheres.

7. A method of providing an on-chip supercapacitor electrode on a silicon substrate, the method comprising:
    a) providing a plurality of one-dimensional silicon nanostructures on the silicon substrate;
    b) coating the one-dimensional silicon nanostructures with a first layer of titanium nitride (TiN); and
    c) coating a second layer of manganese dioxide ($MnO_2$) onto the first layer.

8. The method according to claim 7, wherein step c) comprises an electroless chemical deposition process.

9. The method according to claim 8, wherein step c) comprises:
    i) in a reaction chamber, exposing the one-dimensional silicon nanostructures to a solution containing $KMnO_4$, wherein the solution is exposed to $N_2H_4$ gas.

10. The method according to claim 9, wherein step i) comprises performing step c) for a reaction period of between 6 and 12 hours.

11. The method according to claim 7, wherein the second layer is a conformal layer.

* * * * *